United States Patent [19]

Sulenski

[11] Patent Number: 5,229,815
[45] Date of Patent: Jul. 20, 1993

[54] AUTOMATIC MACHINE QUALITY ADJUST RESTART AFTER PREMATURE INTERRUPTION

[75] Inventor: Shelly D. Sulenski, Walworth, N.Y.

[73] Assignee: Xerox Corporation, Stamford, Conn.

[21] Appl. No.: 941,337

[22] Filed: Sep. 4, 1992

[51] Int. Cl.⁵ .............................................. G03G 15/00
[52] U.S. Cl. ..................................... 355/207; 355/208
[58] Field of Search .............. 355/204, 207, 208, 206, 355/205; 371/12, 16.4

[56] References Cited

U.S. PATENT DOCUMENTS

| | | | |
|---|---|---|---|
| 4,521,847 | 6/1985 | Ziehm et al. | 371/12 X |
| 4,947,397 | 8/1990 | Sobel et al. | 371/16.4 |
| 5,032,903 | 7/1991 | Suzuki et al. | 358/75 |
| 5,170,397 | 12/1992 | Hurtz et al. | 371/16.4 |

Primary Examiner—Joan H. Pendegrass
Attorney, Agent, or Firm—Ronald F. Chapuran

[57] ABSTRACT

A method of restarting an image quality adjustment process including the steps of initiating an image quality adjustment process, monitoring machine events during the image quality adjustment process, suspending operation of the quality adjustment process due to the occurrence of a predetermined machine event, and automatically resuming the quality adjustment process in response to the elimination of the predetermined machine event at the point of the process wherein the predetermined machine event ocurred.

10 Claims, 5 Drawing Sheets

AUTOMATIC MACHINE QUALITY ADJUST RESTART AFTER PREMATURE INTERRUPTION

BACKGROUND OF THE INVENTION

The invention relates to the automatic re-initiation of a quality adjustment cycle in an imaging machine and, more particularly, to an automatic machine quality adjust start after premature interruption of the machine.

It is important in the operation of complex electronic equipment such as reproduction machines to maintain the quality of the finished copy sheets. To this end, machines often undergo periodic quality adjustments. The need for quality adjustments becomes even more crucial in machines adapted for highlight color or full color reproductions. Such machines often require more extensive or more frequent analysis and operator attention or correction to produce a quality color product. However, it is also important for operator efficiency to reduce the operator time spent in monitoring and correcting the machine operation.

There are various types of recovery procedures both automatic and manual, in the prior art for recovery for various types of system malfunctions and shutdowns. The problem of correcting the malfunction and maintaining the integrity of the run in process can be significant problem. For example, jammed copies often require removal before the machine can be restarted. Even minor events such as improperly closed covers or doors will activate intelock switches and inhibit operation. Also in a complex electronic control system, there is a large number of software problems that can cause the control system to temporarily malfunction or crash.

A difficulty with the prior art is that such faults occurring during a copy quality adjust can seriously impede or inhibit a copy quality adjustment in process and require the use of valuable operator time in overseeing the copy adjust process or manually restarting the process once interrupted. It would be desirable, therefore, to provide a copy quality adjustment process that will continue automatically upon correction of malfunctions or events that interrupt the quality adjustment process.

It is an object of the present invention, therefore, to provide a new and improved technique for automatically responding to interrupted copy quality adjustment procedures to continue the quality adjustment procedures. It is still another object of the present invention to eliminate manual intervention to resume a quality adjust procedure that has been interrupted. It is still another object of the present invention to minimize operator involvement to continue a quality adjust cycle. Other advantages of the present invention will become apparent as the following description proceeds, and the features characterizing the invention will be pointed out with particularlity in the claims annexed to and forming a part of this specification.

SUMMARY OF THE INVENTION

Briefly, the present invention is concerned with a method of restarting an image quality adjustment process after a premature interruption including the steps of initiating an image quality adjustment process, monitoring machine events during the image quality adjustment process, suspending operation of the quality adjustment process due to the occurrence of a given machine event, and automatically resuming the quality adjustment process in response to the elimination of the given machine event.

For a better understanding of the present invention, reference may be had to the accompanying drawings wherein the same reference numerals have been applied to like parts and wherein:

DETAILED DESCRIPTION OF THE DRAWINGS

Figure 4:
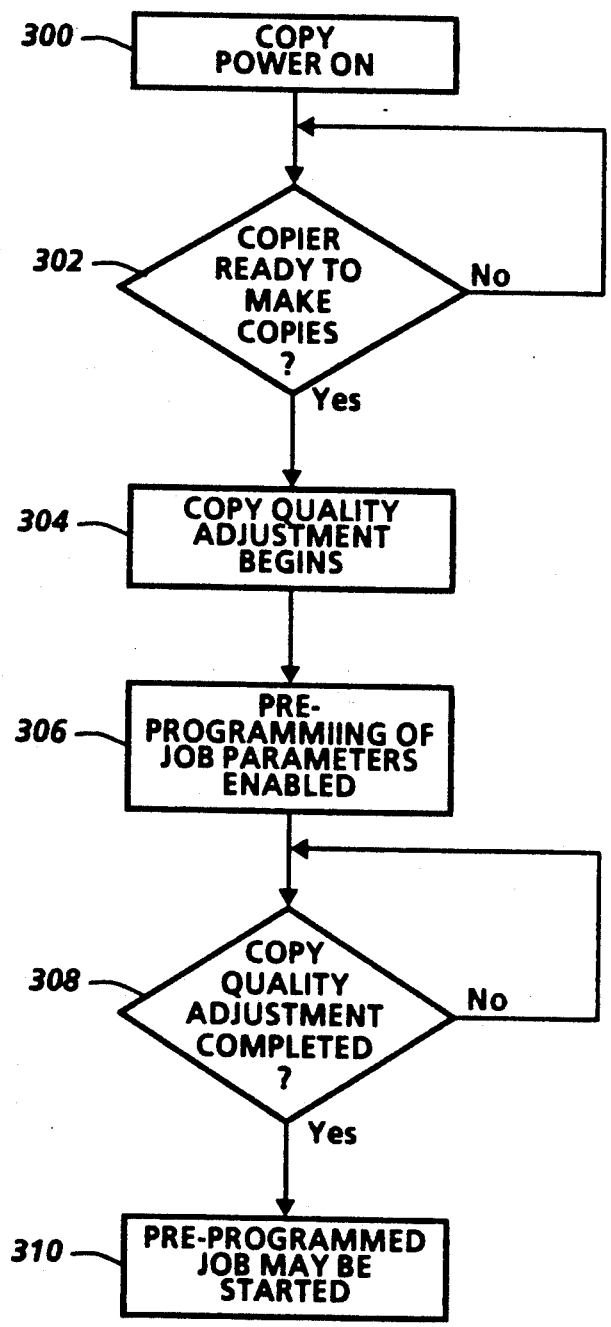
Figure 5:
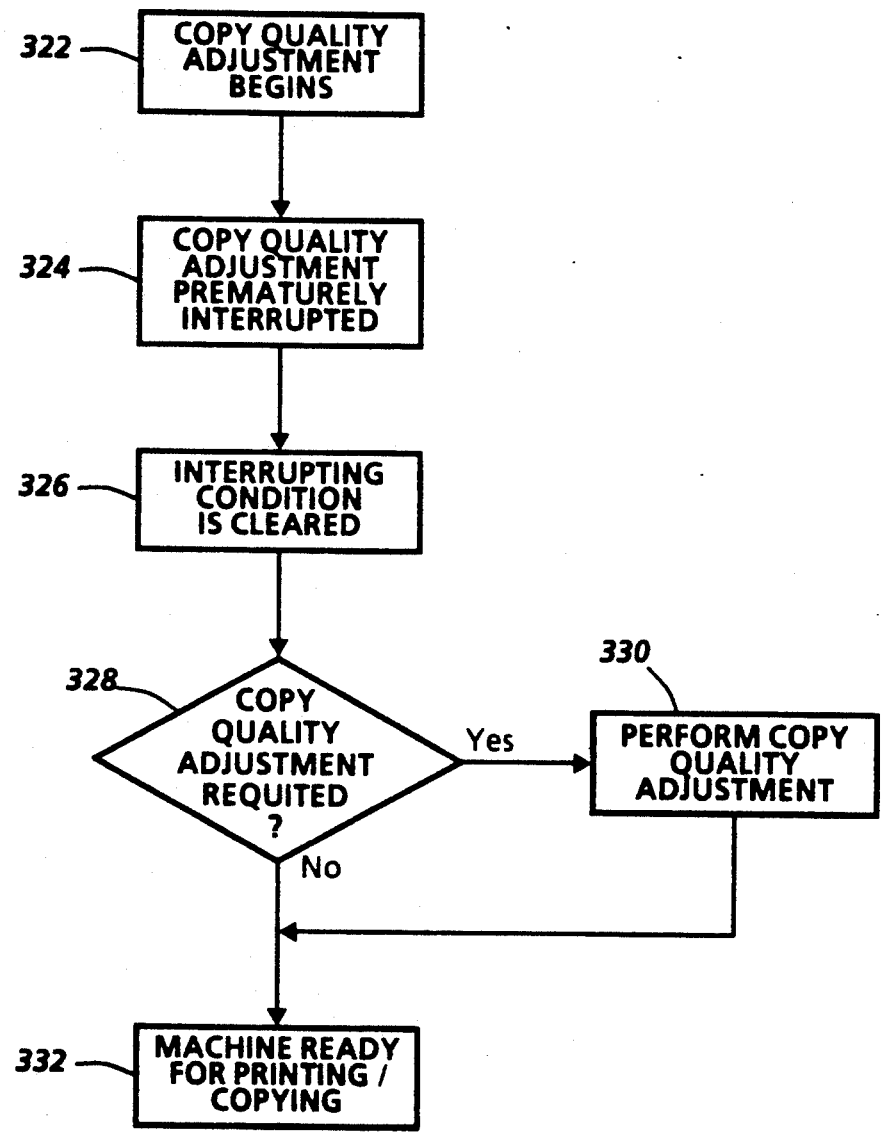

FIG. 4 is a flow chart illustrating job programming during copy quality adjustment technique in accordance with one feature of the present invention; and FIG. 5 is a flow chart illustrating an automatic machine quality adjust restart after premature interruption of the machine quality procedure in accordance with another feature of the present invention While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DETAILED DESCRIPTION OF THE PREFERRED EMBODIMENT

For a general understanding of the features of the present invention, reference is made to the drawings. In the drawings, like reference numerals have been used throughout to identify identical elements.

Figure 1:
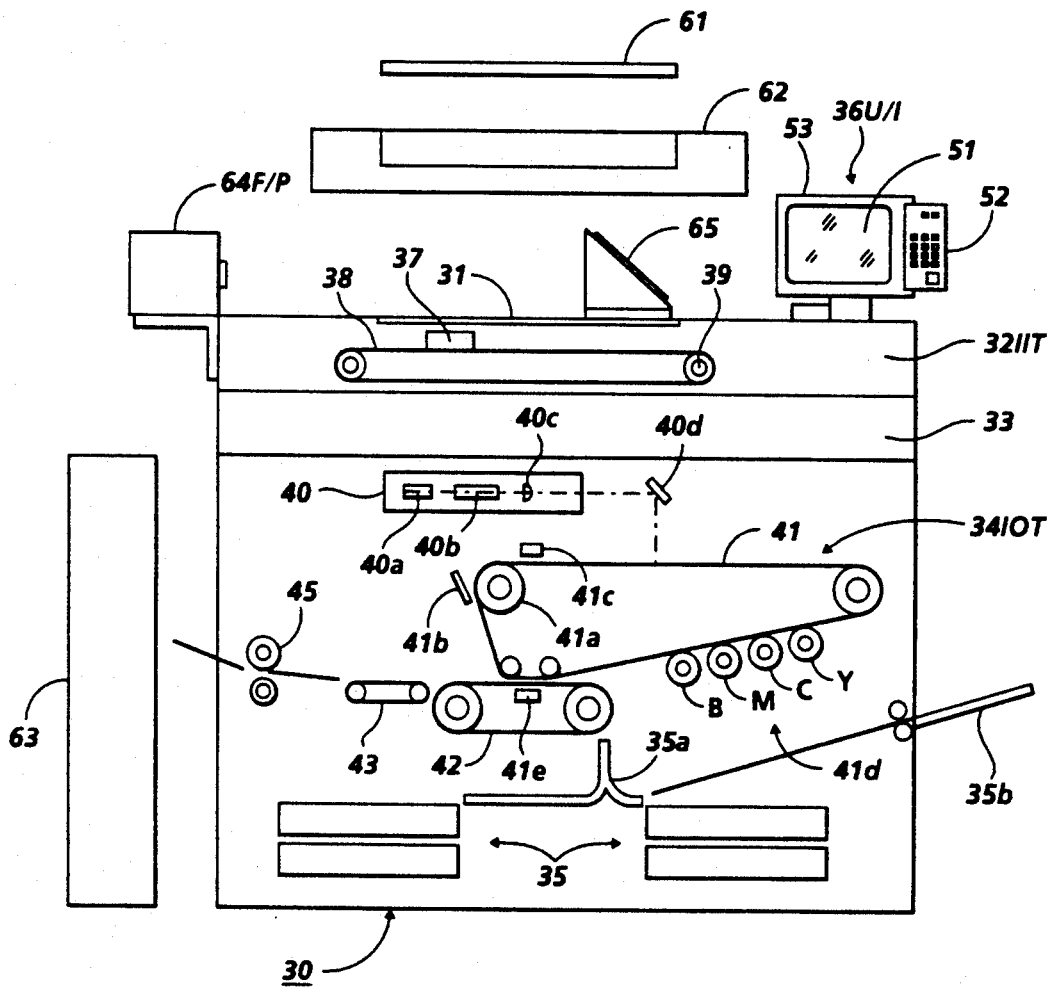
FIG. 1 is a schematic elevational view depicting various operating components and subsystems of a typical machine incorporating the present invention.

FIG. 1 shows one example of the overall construction of a color copying machine to which this Invention is applied. A typical color copying machine to which this Invention is applied is formed with the base machine 30, composed of a platen glass plate 31, which carries the original sheet thereon, an image input terminal (IIT) 32, an electrical control system container 33, the image output terminal (IOT) 34, and a paper tray 35, and a user interface (U/I) 36 and also, as optional items, of an editing pad 61, an automatic document feeder (ADF) 62, a sorter 63, and a film projector (F/P) 64.

Electrical hardware is necessary for performing the control of the IIT, IOT, U/I, etc. mentioned above, and a plural number of boards for control of each of the processing units, such as the IIT, IPS, U/I, F/P, and so forth, which perform the image-forming process for the output signals from the IIT, and these are accommodated further in the electrical control system container 33.

The IIT 32 is composed of an imaging unit 37, the wire 38 for driving the said unit, the driving pulley 39, and so forth, and IIT 32 reads a color original sheet for each of the primary colors B (Blue), G (Green), and R (Red) by means of a CCD line sensor and a color filter provided inside the imaging unit 37, converts the data so obtained into digital image signals and then outputs the signals to the IPS.

In the IPS, the B, G, and R signals mentioned above are transformed into the primary colors of the toner, i.e. Y(Yellow), C(Cyan), M(Magenta), and K(Black), and then, with various data processing being applied to the data so obtained for the purpose of enhancing the reproduction fidelity and fineness, and so forth, the IPS converts the toner signals of the process color in harmonious gradation into binary toner signals and outputs them to the IOT 34.

The IOT 34, which is provided with a scanner 40 and a photosensitive material belt 41, converts the image signals from the abovementioned IPS into optical signals in the laster output part 40a and forms a latent image corresponding to the image on the original sheet on the photosensitive material belt 41 by way of the polygon mirror 40b, the lens 40c, and the reflexive mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full-color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U/I 36 is designed for use by the user for making the selections of the desired functions and for giving instructions regarding the conditions for the execution of the selected functions, and this system is provided with a color display unit 51 and a hardware control panel 52 installed by the side of the said display unit, and it is further combined with an infrared ray touch board 53, so that instructions can be given directly with the "soft buttons" on the screen. For further details reference is made to U.S. Pat. No. 5,032,903 incorporated herein.

Figure 2:
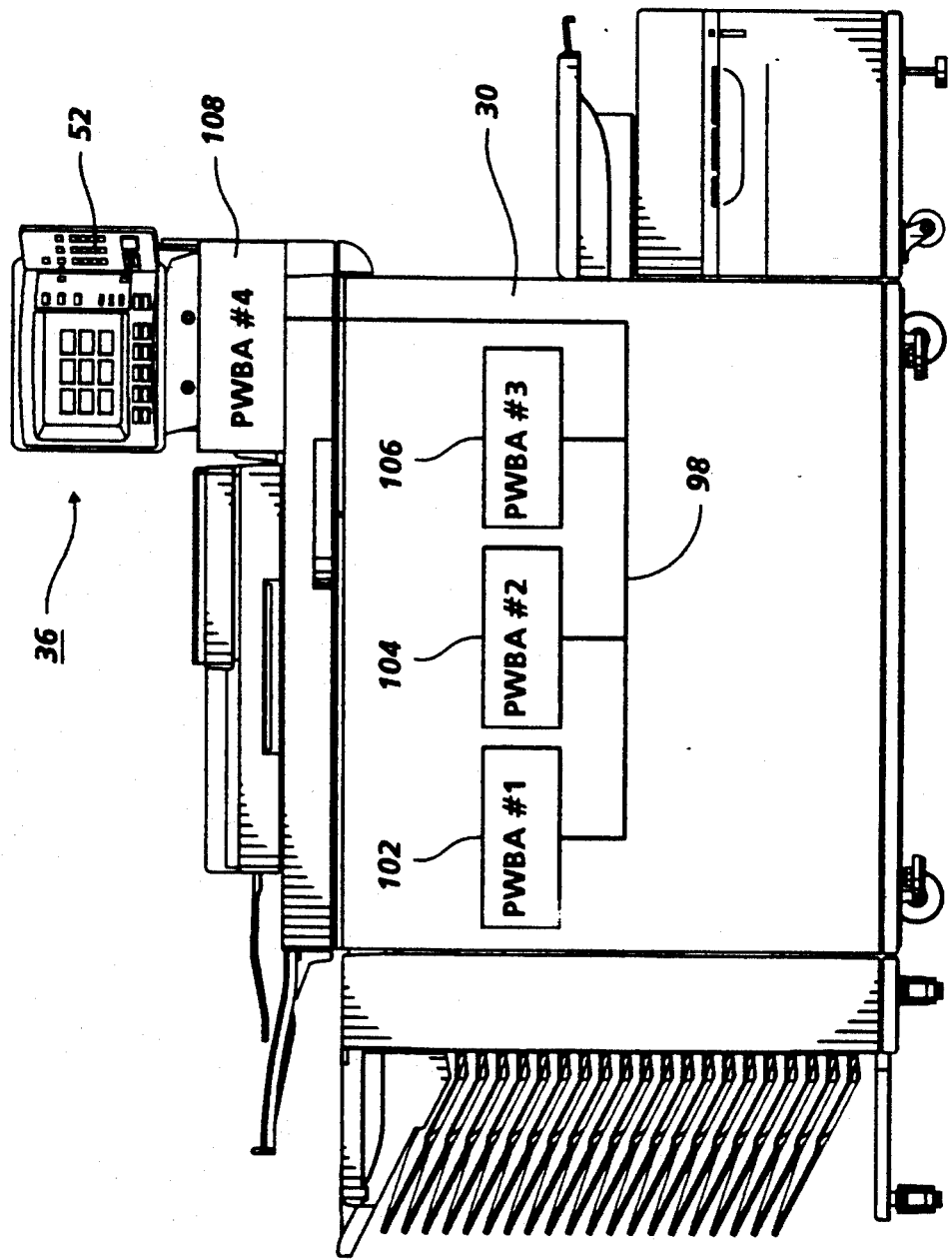
FIG. 2 is a schematic illustrating the control boards for control of the machine shown in FIG. 1.

With reference to FIG. 2, there is illustrated in general block form, the control of the base machine 30 shown in FIG. 1. The base machine is controlled by a plurality of printed wiring boards interconnected to a common channel or bus 98. For purposes of explanation, four printed wiring boards, boards 102, 104, 106 and 108 are illustrated, with printed wiring board 108 being the control for the user interface 36 and the remaining printed wiring boards providing control for predetermined systems and components of the base machine 30. It should be understood that the number of printed wiring boards and the manner of interconnection is merely a design choice and any other suitable control scheme for controlling the base machine is contemplated within the scope of this invention. It should also be noted that one of the printed wiring boards, for example, board 102 could be the master control for the other printed wiring boards or that there could be any number of master slave relationships of the control boards or distributed control of the various functions of the base machine.

Figure 3:
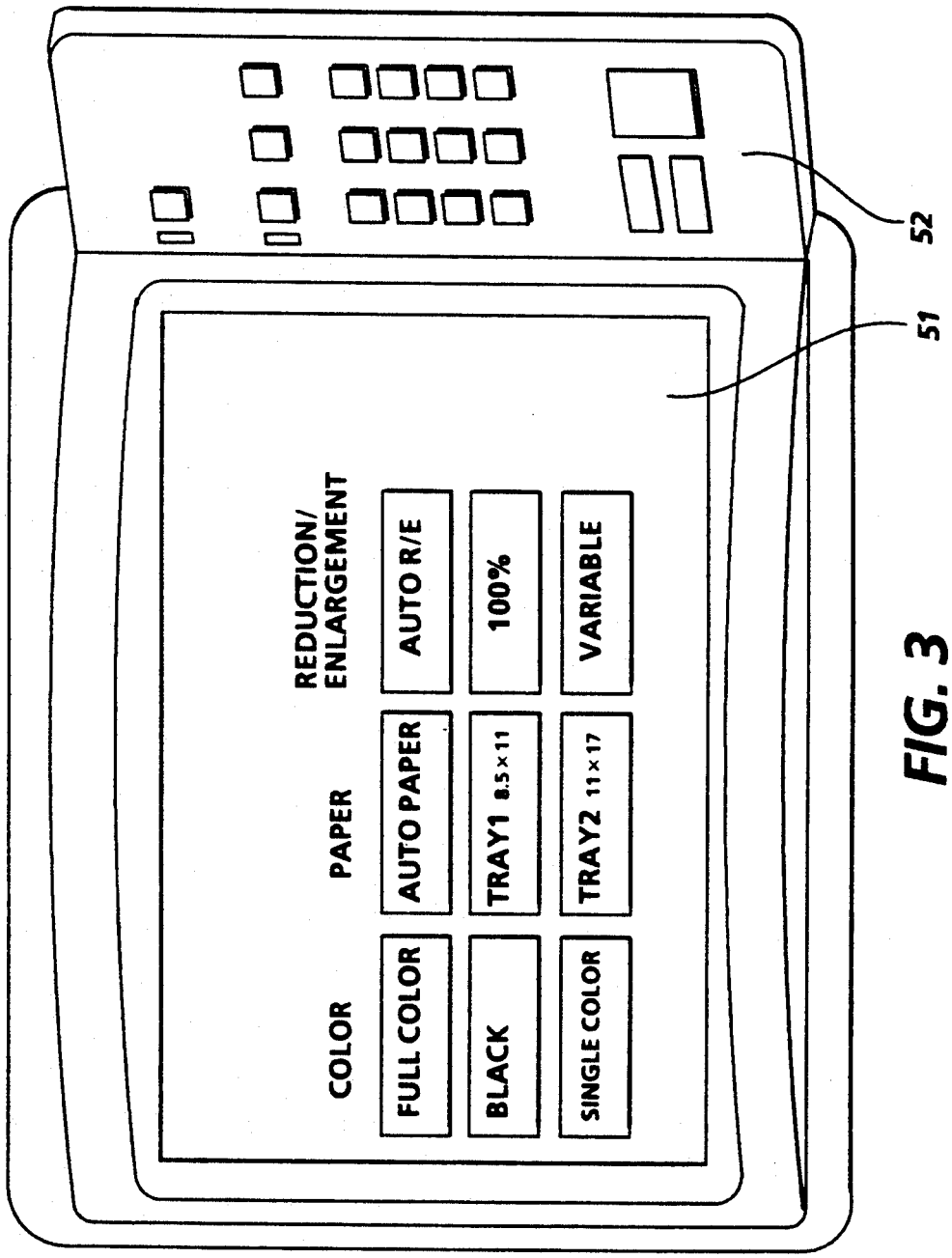
FIG. 3 is an exploded view of the touch monitor screen depicted in FIG. 2.

For purposes of understanding the present invention, it is only necessary to know that the base machine 30 has control software resident on several printed circuit boards that communicate with each other using a common network, and that the base machine 30 has a user interface 36 that is controlled by software that is also part of the common network, illustrated by printed circuit board 108. FIG. 3 is merely a simplified version of the color display unit 51, and hardware control panel 52 of the user interface 36 illustrating various soft control buttons such as full color, auto paper, and auto reduction/enlargement.

The printed circuit board 108 controlling the user interface 36, is able to monitor all communications on the network 98 and display the communications on the screen 51. In the event of a machine malfunction, the service representative enters a hard key sequence that is recognized by the printed circuit board 108. This recognition of the key sequence by the printed circuit board 108 enables the control 108 to monitor the communications network 98 and display the communications appearing on the screen 51. In short, the service representative merely enables a predetermined key sequence at the hardware control panel 52 to initiate a communications network monitor mode to monitor communications between selected elements such as the printed wiring boards 102, 104, 106 and 108 on the network 98.

In accordance with one feature of the present invention, the machine operator is able to set up or program the next or a future machine job while the machine is currently in a copy quality adjustment mode. This includes full feature programming as illustrated by the touch screen 51 in FIG. 3. In other words, while the machine is in a copy quality adjust mode, the operator can concurrently select features for a subsequent job run such as full color, black, or single color, or a particular size paper such as tray 1 containing 8.5×11" copy sheets or tray 2 containing 11"×17" copy sheets, or select a particular reduc/enlargement mode.

It should be understood that the screen 51 of FIG. 3 is exemplary and that additional soft buttons can be displayed in the same frame or subsequent frames and can be selectively engaged by the operator during the copy quality adjust. Also there can be a selection of suitable hard buttons shown on the panel 52 in accordance well known preprogramming techniques. For example, either hard or soft buttons can be used to select full size copies, 94% size copies, 77% size copies or any variable size copy as well as buttons to engage a recirculating document feeder to operate in a collate mode or non-collate mode. In addition, suitable buttons can enable the operator to select in a given machine environment finisher operations such as stapled, non-stapled, non-colated, and such features as duplex copying and offset stacking.

It should be understood that the scope of the present invention is intended to cover not only setting the machine or configuring the machine for a next subsequent job to be initiated immediately after the completion of the copy quality adjustment, but also to cover the pre-programming of the machine to initiate a complete job run after the completion of a job run in process that has been interrupted by the copy quality adjust sequence. In addition, it should be understood that in accordance with known techniques of multiple job pre-programming, including exception programming, the machine can be preprogrammed for multiple jobs including exception programming while the machine is in a copy quality adjust mode. For example, the operator can concurrently in a particular pre-program operation, predetermine documents within a document set be selected for specific features and functions. Thus, a whole range of pre-programming and exception programming for predetermined selected documents in a particular set can be concurrently accomplished. This can be done by the use of soft and hard buttons with or without a use of a screen display at an operator consul to set the machine up for subsequent job runs while the machine is currently in a copy quality adjust mode. It should also be understood, that although a typical machine may be in one of several states throughout the operation of the machine, such as a cycle up or cycle down state, a ready state, an operating state, or a quality adjust state, the scope of the present invention is intended to cover concurrent pre-programming of the machine during a copy quality adjust sequence regardless of the state of the machine.

With reference to FIG. 4, there is illustrated one scenario of the feature of concurrent job programming during copy quality adjust. Block 300 illustrates a copier power on condition, but could indicate a cycle up mode. The decision block 302 illustrates the decision as to whether or not the copy is ready to make copies. If not, presumably additional cycle up or pre-operational analysis is required to insure that all operating components are ready for operation before initiation of a job. At block 304, a copy quality adjustment is initiated. This could be a periodic time adjustment, or an automatically initiated copy quality adjustment depending upon machine conditions.

Block 306 illustrates the pre-programming of job parameters enabled. In other words, the operator consul either via hard buttons or a soft buttons on display screen are available for operator preprogramming. At such a time, a suitable message on the display screen can be provided to inform the operator that the machine is in a condition pre-programming operations. At this time, as it known in the prior art, a suitable sequence of frames or windows of machine features can be displayed for operator selection.

Block 308 is a decision as to whether or not the copy quality adjustment has been completed. If not, the machine cycles back to continue the copy quality adjustment. If completed, block 310 illustrates that the pre-program job may be started. The pre-program job could be automatically started upon the completion of the copy quality adjustment or as indicated above could be automatically started after the completion of a current job in process or could be one of several jobs in a job queue to be started as required.

In accordance with another feature of the present invention, the system will automatically restart a copy quality adjustment that has been interrupted prematurely due to a machine fault or operator intervention. There are various types of recovery procedures both automatic and manual, in the prior art for recovery for various types of system malfunctions and shutdowns. The problem of correcting the malfunction and maintaining the integrity of the run in process can be a significant problem. For example, jammed copies ofter require removal before the machine can be restarted. Even minor events such as improperly closed covers or doors will activate intelock switches and inhibit operation. Also in a complex electronic control system, there is a large number of software problems that can cause the control system to temporarily malfunction or crash.

Such faults occurring during a copy quality adjust can seriously impede or inhibt a copy quality adjustment in process. In accordance with the present invention, the copy quality adjustment process will continue automatically upon correction of the malfunction. That is, once a malfunction has been corrected or an inappropriately opened door has been closed or the machine reset after a software crash, the copy quality adjust cycle need not be reinitiated or require manual intervention to continue, but will automatically resume after the correction.

In accordance with the feature of automatic restart of the present invention, with reference to FIG. 5, block 322 illustrates the initiation of a copy quality adjustment. The copy quality adjustment could be initiated in any several ways such as a scheduled periodic copy quality adjustment, a copy quality adjustment in response to any of several events, or even an externally initiated copy quality adjustment. Block 324 illustrates the interruption of the copy quality adjustment. As discussed above, the interruption can be any hardware or software interruption caused by various malfunctions or software crashes of the machine or even by externally initiated actions such as the opening of a door or cover.

Block 326 illustrates that the interrupting condition has been cleared or eliminated in that no conditions exist to inhibit the continuation of the copy quality adjustment process. It should be understood that it is within the scope of the present invention that as long as the machine is capable of continuing with the copy quality analysis and adjustment process, the interrupting condition can be considered to be cleared. That is, the quality adjustment can continue even though other machine interrupting conditions exist that have no effect upon the copy quality adjustment procedure.

At the decision block 328, upon the sensing that the interrupting condition has been eliminated or cleared or has no effect upon the copy quality adjustment process, the decision is made whether or not a copy quality adjustment is required or still required. If the copy quality adjustment process has been completed at the time of the interruption or for any other reason is not required, the machine is then ready for printing or copying as illustrated at block 332. On the other hand, if the copy quality adjustment is required because it has been interrupted before completion, the machine continues to perform the copy quality adjustment as illustrated at block 330.

While the invention has been described with reference to the structure disclosed, it is not confined to the details set forth, but it is intended to cover such modifications or changes as may come within the scope of the following claims.

I claim:

1. In an image processing apparatus having image processing components for forming images on a medium, a controller for directing the operation of the image processing components including an image quality adjustment process for maintaining image quality standards, the method of responding to a machine interruption comprising the steps of:

monitoring the operation of the image processing apparatus relative to image quality, determining a deviation from the image quality standards, responding to the deviation from the quality standards to initiate the quality adjustment process, delaying operation of the quality adjustment process due to a machine event, and automatically resuming the quality adjustment process in response to the clearance of the machine event.

2. The method of claim 1 wherein the step of delaying operation of the quality adjustment process includes the step of suspending operation of the quality adjustment process due to software crash.

3. The method of claim 1 wherein the step of delaying operation of the quality adjustment process includes the step of suspending operation of the quality adjustment process due to a machine malfunction signal.

4. The method of claim 1 wherein the step of automatically resuming the quality adjustment process includes the step of continuing the quality adjustment process at the point of the process wherein the machine event ocurred.

5. In an image processing apparatus having image processing components for forming images on a medium, a controller for directing the operation of the image processing components including an image quality adjustment process for maintaining image quality standards, the method of completing the image quality adjustment process comprising the steps of:
  initiating an image quality adjustment process in response to a deviation from the quality standards,
  monitoring machine events during the image quality adjustment process,
  suspending operation of the quality adjustment process due to the occurrence of a predetermined machine event, and
  automatically resuming the quality adjustment process in response to the elimination of the predetermined machine event.

6. The method of claim 5 wherein the step of monitoring machine events during the image quality adjustment process includes the step of recognizing the occurrence of predetermined machine events.

7. The method of claim 5 wherein the step of suspending operation of the quality adjustment process includes the step of suspending operation due to controller software crashes or machine malfunctions.

8. The method of claim 5 wherein the step of automatically resuming the quality adjustment process includes the step of continuing the quality adjustment process at the point of the process wherein the machine event ocurred.

9. The method of completing an image quality adjustment process in image processing apparatus having image processing components for forming images on a medium and a controller for directing the operation of the image processing components including an image quality adjustment process for maintaining image quality standards, comprising the steps of:
  initiating an image quality adjustment process in response to a deviation from the quality standards,
  monitoring machine events during the image quality adjustment process,
  recognizing the occurrence of a predetermined machine event,
  suspending operation of the quality adjustment process due to the occurrence of a predetermined machine event, and
  automatically resuming the quality adjustment process in response to the elimination of the predetermined machine event at the point of the process wherein the predetermined machine event ocurred.

10. The method of claim 9 wherein the step of suspending operation of the quality adjustment process includes the step of suspending operation due to controller software crashes or machine malfunctions.

* * * * *